United States Patent [19]

Mann

[11] Patent Number: 5,037,454
[45] Date of Patent: * Aug. 6, 1991

[54] COALESCING APPARATUS AND METHOD

[75] Inventor: David O. Mann, Hamilton, Ind.

[73] Assignee: Mann Technology Limited Partnership, Greenville, S.C.

[*] Notice: The portion of the term of this patent subsequent to Nov. 20, 2007 has been disclaimed.

[21] Appl. No.: 453,167

[22] Filed: Dec. 26, 1989

Related U.S. Application Data

[63] Continuation of Ser. No. 265,895, Nov. 2, 1988, abandoned, which is a continuation of Ser. No. 37,705, Apr. 13, 1987, Pat. No. 4,801,313.

[51] Int. Cl.⁵ ............................................. B01D 53/04
[52] U.S. Cl. .......................................... 55/35; 55/74; 55/187; 55/316; 55/DIG. 17; 210/DIG. 5
[58] Field of Search .................... 55/35, 179, 180, 208, 55/310, 500, DIG. 17, 320-323, 185-187, 74; 210/DIG. 5

[56] References Cited

U.S. PATENT DOCUMENTS

| | | | |
|---|---|---|---|
| 1,652,309 | 12/1927 | Kingdon | 55/322 |
| 2,747,681 | 5/1956 | Schurftan et al. | 55/180 |
| 3,252,270 | 5/1966 | Pau et al. | 55/316 X |
| 3,483,677 | 12/1969 | Pinto | 55/316 |
| 3,791,105 | 2/1974 | Rhodes | 55/322 X |
| 3,796,025 | 3/1974 | Kasten | 55/316 |
| 3,876,544 | 4/1975 | Fowler | 210/DIG. 5 X |
| 3,955,945 | 5/1976 | Bauer | 55/185 X |
| 4,043,774 | 8/1977 | McGrath | 55/316 X |
| 4,058,463 | 11/1977 | Barlik | 210/DIG. 5 X |
| 4,121,916 | 10/1978 | Fricke | 55/316 |
| 4,124,360 | 11/1978 | Barger et al. | 55/187 |
| 4,240,908 | 12/1980 | Swain et al. | 210/DIG. 5 X |
| 4,259,097 | 3/1981 | Pryer et al. | 55/DIG. 17 X |
| 4,428,619 | 10/1984 | Arends et al. | 55/316 |
| 4,519,819 | 5/1985 | Frantz | 55/179 X |
| 4,600,416 | 7/1986 | Mann | 55/323 |
| 4,801,313 | 1/1989 | Mann | 55/179 |

OTHER PUBLICATIONS

Chemical Engineering Progress, vol. 62, Apr. 1966, pp. 60-65.

Primary Examiner—Charles Hart
Attorney, Agent, or Firm—Bailey & Hardaway

[57] ABSTRACT

A gas purification apparatus which is operable utilizing an upflow direct impingement coalescer. A central inlet in the lower portion of a column expands the flow of air and liquid droplets (vertical flow to horizontal separation). The droplets lose velocity and are impinged in the packing. Migration is first outward from the main gas flow and then downward. Finally, the liquids are drained at the bottom. A collar around the central inlet insures that liquid will not reenter into the central inlet.

14 Claims, 2 Drawing Sheets

COALESCING APPARATUS AND METHOD

This application is a continuation of application Ser. No. 07/265,895, filed Nov. 2, 1988 abandoned which is a continuation, of application Ser. No. 07,037,705, filed Apr. 13, 1987 now U.S. Pat. No. 4,801,313.

BACKGROUND OF THE INVENTION

This invention relates generally to the art of gas purification and more particularly to a gas purification apparatus utilizing an upflow direct impingement coalescer.

Various apparatus exist in the prior art for purification of gases and particularly for the removal of sorbed or otherwise liquid material therein. One such apparatus is described in U.S. Pat. No. 1,458,005 to Rohrer. Rohrer discloses an apparatus for removal of oil from compressed air wherein the air is passed vertically into an expansion chamber, passed through a filter to a supply hose. There is provided in the bottom of the expansion chamber a drain for removal of oil.

Persinger describes in U.S. Pat. No. 4,303,422 an apparatus for removing impurities from natural gas wherein the gas to be purified is passed upwardly and then transversly into an expansion chamber where it proceeds to pass through a molecular sieve thereabove. Contaminants can be removed from the bottom of the expansion chamber.

Clay et al describe in U.S. Pat. No. 4,162,904 a cyclone-type separator for gas purification and silencing.

Bauer describes an additional apparatus for removal of oil from compressed air as it leaves the compressor in U.S. Pat. No. 3,955,945.

Daniels describes in U.S. Pat. No. 2,691,425 a condenser-type air cleaner for removal of oil vapors from compressed gas.

Hasselwander describes in U.S. Pat. No. 2,606,628 a filter apparatus having a drain in the bottom thereof which utilizes a common member for both an inlet and outlet of the gas to be cleansed.

Beutelspacher describes in U.S. Pat. No. 609,493 an air purification unit for use with a beer pressurization pump for the removal of oil, water and solid impurities from the pressurized air.

The purification unit has a drain in the bottom thereof.

While these various prior art devices are operable for their intended functions, they do not possess the adaptability to be utilized in a variety of applications.

SUMMARY OF THE INVENTION

It is thus an object of this invention to provide a gas purification apparatus which may be utilized in a variety of applications.

It is a further object of this invention to provide such a gas purification apparatus which is operable without a sump so as to eliminate the batchwise collection of impurities removed from the gas.

It is a still further and more particular object of this invention to provide such a gas purification apparatus which may be coupled with other media to provide for removal of a variety of substances from the gas.

These as well as other objects are accomplished by a gas purification apparatus formed from a first vertical column having a bottom opening and a top opening with a vertically directed inlet in a central portion of the bottom opening for direct fluid communication into the hollow of the column. A drain basin is defined concentrically about the inlet which generally closes the bottom open end of the first column. A coalescing zone exists above the inlet which has a greater diameter than the diameter of the inlet. A second hollow vertical column is parallel to the first column with top and bottom openings also. A conduit connects the top of the second column so as to provide fluid communication thereto. A closure exists for the bottom of the second column which defines a gas exit therein. Various media may exist within the columns such as an adsorbent for the removal of various contaminants.

DETAILED DESCRIPTION

In accordance with this invention it has been found that the combination of at least two parallel columns providing an upflow coalescer in one of the columns with a concentric drain in the bottom thereof provides greater flexibility of applications that has heretofore existed within the prior art. Various other advantages and features will become apparent from a reading of the following description given with reference to the various figures of drawing.

Figure 1:
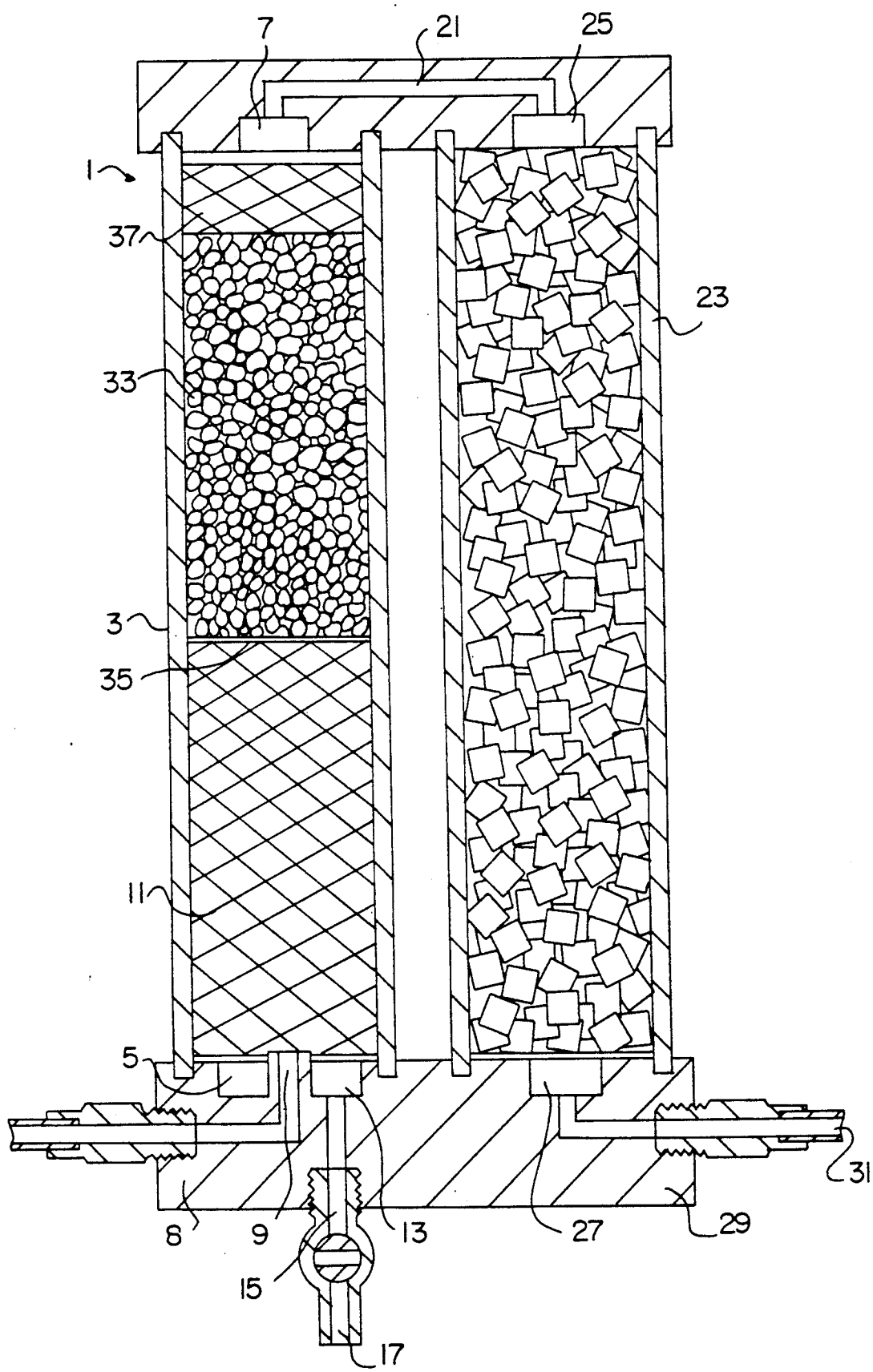
FIG. 1 of the drawings is a cross-sectional view of the gas purification apparatus for this invention.

FIG. 1 of the drawings illustrates the gas purification apparatus 1 of this invention. The apparatus comprises a first vertical column 3 illustrated in cross-section. The column 3 has a bottom opening at 5 and a top opening at 7. Means 8 define an inlet 9 preferably in a central portion of column 3 and in a central portion of the bottom opening 5. The inlet 9 is vertically directed for direct fluid communication into the hollow of column 3. Inlet 9 directly contacts coalescing material 11 which is packed into the coalescing zone of column 3.

It should be noted that the coalescing zone packed with material 11 is of significantly greater diameter than inlet 9 so as to provide for a general lessening of velocity so as to provide for coalescing of such materials as moisture and oil vapor which will generally tend to move downwardly after coalescing upon coalescing material 11. Preferably, coalescing material 11 is a stranded coalescing material of the type sold under the designation "Goodloe."

Any coalesced material which moves downwardly within column 3 is collected within drain basin or collar 13 which is preferably a concentric indentation about inlet 9. Drain basin 13 communicates through 15 to exit port 17 which is preferably provided with a variable orifice valve to achieve equilibration during continuous operation and prevent accumulation of significant liquid within drain basin 13.

Column 3 communicates through conduit means 21 with a second column 23 having a top opening 25 and bottom opening 27. A closure 29 closes bottom opening 27 and defines an exit 31 therein for removal of purified gases. Second column 23 as well as portions of column 3 may be appropriately packed as is to be further described.

Column 3 may be packed above coalescing material 11 with an adsorbent such as granulated activated charcoal 33 which is preferably separated from coalescing material 11 by screen 35. The absorbent is held in position within column 3 by a support 37 which will not allow migration of filter medial or filtrate. Support 37 may be formed of HEPA.

The second column 23 may be filled with filter media to help remove undesireable gases. The filter media may be other material known as HEPA (high efficiency particulate filter) or also the material identified as HEIP.

Figure 2:
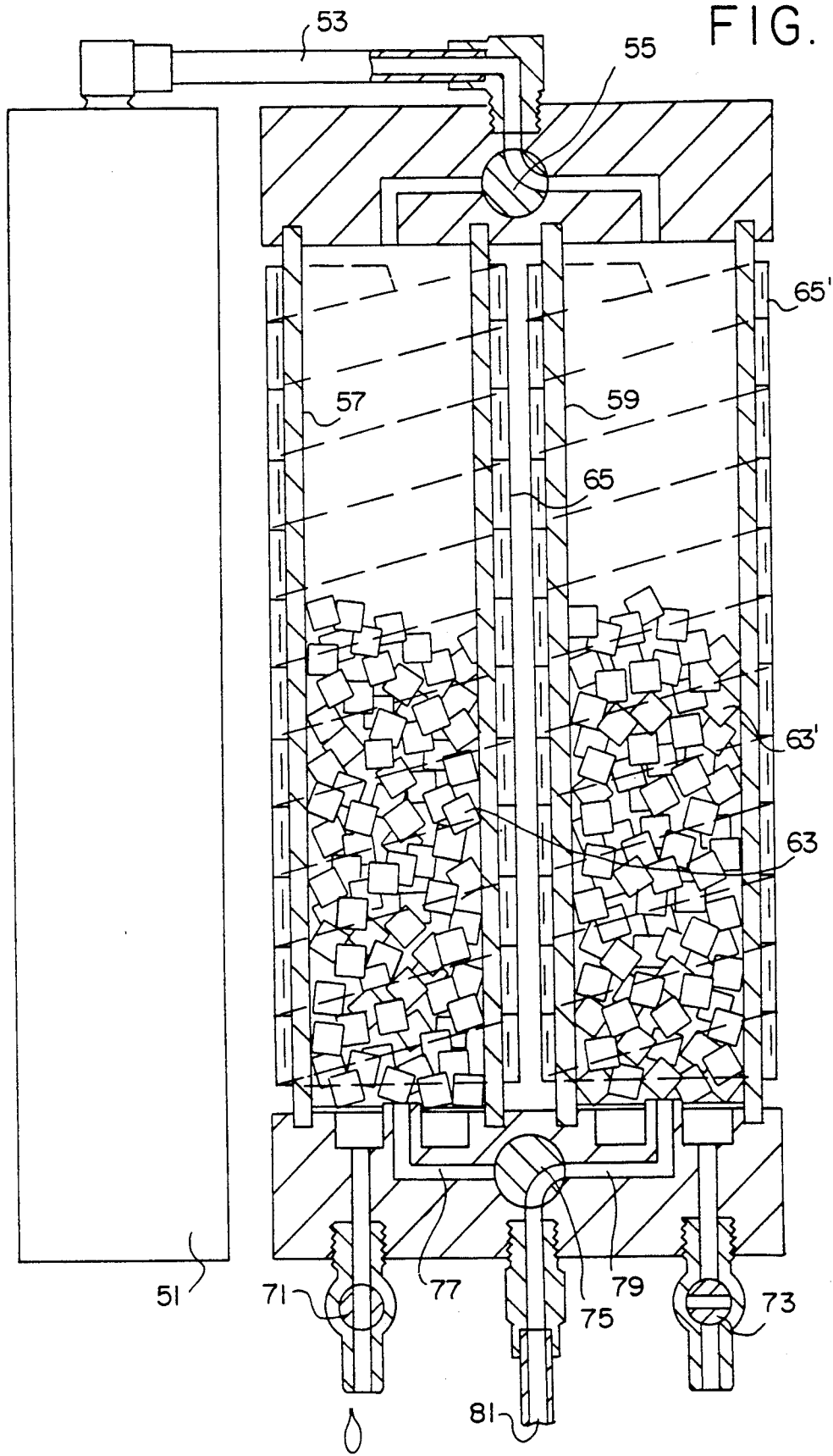
FIG. 2 of the drawings is a view similar to FIG. 1 of an additional embodiment of this invention.

A preferred form of this invention for the removal of moisture involves the use of a desiccant such as activated aluminum in second column 23. A preferred form of this arrangement is illustrated in FIG. 2 of the drawings wherein whole column 51 is illustrated and which is substantially identical to column 3 illustrated in FIG. 1 of the drawings. In this embodiment column 51 communicates through conduit means 53 with selective valve 55. Selective valve selectively directs the fluid substance coming through conduit means 53 to either of identical columns 57 or 59. Both columns 57 and 59 contain a desiccant such as activated aluminum 63 and 63'. Both columns contain heaters such as coil heaters at 65 in column 57 and 65' in column 59. Both columns 57 and 59 have drains similar to those illustrated in FIG. 1 respectively at 71 and 73. Upon adjustment of valve 55, either column 57 or 59, whichever is not being utilized, may have the desiccant 63 or 63' regenerated by activation of respective heating coils 65 or 65' to cause moisture therein to flow through the appropriate drain 71 or 73.

An additional selective valve 75 is illustrated in communication with conduit means 77 of column 57 or 79 of column 59. Valve 75 is selectively adjusted in coordination with valve 55 so as to provide for communication with the appropriate column. Thus, gas passing through valve 55 and into column 59 would pass into conduit 79 into valve and out outlet 81.

With this arrangement columns 57 and 59 are periodically switched so that the used desiccant is regenerated by heat therein and the moisture drained away so that the column will be ready for use when the mating column becomes near saturation.

It is thus seen that a novel gas purification apparatus is provided by this invention having the ability to be utilized in a variety of applications. Such applications include removal of moisture and/or oil from compressed air as well as general applications for the removal of undesireable contaminants.

Since the above description is exemplary in nature, many modifications thereof will become apparent to those of skill in the art from a reading thereof. Such variations are included within the spirit and scope of this invention as defined by the following appended claims.

I claim:

1. An apparatus for removing contaminants from a gaseous stream, comprising:
    a first hollow vertical column having a bottom opening and a top opening;
    means defining an inlet in a central portion of said bottom opening, said inlet being vertically directed for fluid communication direction into the hollow of said first column;
    means defining a drain basin about said inlet and otherwise closing said open end;
    a coalescing zone in said hollow above said inlet of greater diameter than said inlet;
    a coalescing material packed in said coalescing zone;
    a second hollow vertical column separate from to said first column, said second hollow vertical column having inlet and outlet openings therein;
    conduit means connecting said top opening of said first hollow column to said inlet opening of said second hollow column to permit gas flow from said top opening of said first column to said inlet opening of said second hollow column; and
    means for defining said outlet in said second column opposite said inlet;
    a filter media in the hollow of said second hollow column;
    said first and second hollow columns being in closely disposed relationship whereby said gaseous stream is introduced into said inlet at the bottom of said first hollow column and expands while moving vertically upwardly through said first hollow column to cause coalescing of moisture containing impurities in said coalescing zone packed with coalescing material and to pass out of said first hollow column through said conduit means from said first hollow column to the inlet of said second hollow column to pass through said second hollow column through the filter media therein to remove impurities remaining in said gaseous stream and to pass from the outlet therein as a gaseous stream having impurities removed therefrom, said moisture containing impurities coalescing in said coalescing zone of said first hollow column and moving vertically downwardly to be collected in said drain basin.

2. The structure as set forth in claim 1 wherein said drain basin is annular and extends entirely about said means defining an inlet.

3. The structure set forth in claim 1 wherein said first and second columns are arranged in side by side relation.

4. The apparatus according to claim 1 wherein said coalescing zone is packed with stranded coalescing material.

5. The apparatus according to claim 1 further comprising a catalyst within said second column to assist in removal of contaminants from said gas.

6. The apparatus according to claim 1 further comprising
    a desiccant in said second column; and
    a heater in said second column for periodic activation to reactivate said desiccant upon saturation thereof with moisture.

7. The apparatus according to claim 6 further comprising a third vertical column parallel to said first and second column having a top opening and a bottom opening;
    second conduit means communicating said third column with said first and second column;
    means in said second conduit means for establishing fluid communication either between said first column and said second column or said first column and said third column;
    a desiccant in said third column similar to the desiccant in said second column;
    a heater in said third column similar to the heater in said second column whereby said second conduit means and said second and third columns may be alternately reactivated while the other column is in use;
    means connecting the bottom opening of said third column with the outlet of said second column; and means for removing moisture from said second and third columns upon reactivation of desiccant in said second and third columns.

8. The method of removing contaminants from pressurized gas comprising the steps of:
provisioning a vertical hollow coalescing column having a cylindrical inside zone packed with a coalescing material;
forming a gaseous stream in said coalescing column by directing pressurized gas upwardly of said coalescing column from an orifice of lesser diameter than said coalescing column subjecting said gaseous stream to the action of said coalescing material by direct contact therewith;
causing said contaminants to coalesce and move downwardly in a direction opposite to said upward flow of said gaseous stream;
removing said gaseous stream from said coalescing column after passing upwardly through said coalescing material;
collecting said contaminants in an area extending about said gaseous stream; and
discharging said contaminants collected from said coalescing column;
whereby coalescence of contaminants occurs in a direction opposite to gravity with collection and discharge of said contaminants from said coalescing column.

9. The method set forth in claim 8 including centrally position said orifice forming said gaseous stream centrally of said coalescing column.

10. The method set forth in claim 8 including filtering said gaseous stream after passing through said coalescing material.

11. The method set forth in claim 8 including the steps of: causing said gaseous stream to flow across from said coalescing column to a filtering column arranged in side by side relation to said coalescing column, and then causing said gaseous stream to flow downwardly through said filtering column.

12. A process for removing contaminants from a gaseous stream comprising steps of:
providing;
an apparatus for removing contaminants from a gaseous stream, comprising:
a first hollow vertical column having a bottom opening and a top opening;
means defining an inlet in a central portion of said bottom opening, said inlet being vertically directed for fluid communication directly into the hollow of said first column;
means defining a drain basis generally concentrically located about said inlet and otherwise closing said open end;
a coalescing zone in said hollow above said inlet of greater diameter than said inlet;
a coalescing packing in said coalescing zone;
a second hollow vertical column separate from to said first column, said second hollow vertical column having top and bottom openings therein;
conduit means connecting said top opening of said first hollow column to said top opening of said second hollow column to permit gas flow from said top opening of said first column to said top opening of second hollow column; and
means for closing the bottom opening of said second hollow column and defining an exit therein;
introducing into said inlet at the bottom of said first hollow column a gas stream which moves upwardly and expands while moving vertically upwardly through said first hollow column to cause coalescing of impurities in said coalescing zone packed with coalescing material;
collecting coalesced impurities in said basin;
passing said gas stream out of said first hollow column through said conduit means from said first hollow column to said second hollow column;
passing said gaseous stream downwardly through said second hollow column through the filter media therein to remove impurities remaining in said gaseous stream; and
passing said gaseous stream from the exit of said second hollow column as a gaseous stream having impurities removed therefrom.

13. A coalescing apparatus for removing a liquid from a gaseous stream comprising:
a hollow upright column having a bottom opening and a top opening;
an inlet in said bottom opening, said inlet being upwardly directed for fluid communication directly into the hollow of said column;
a coalescing zone in said hollow above said inlet of greater diameter than said inlet;
a coalescing material packed in said coalescing zone;
said gaseous stream being introduced into said inlet and directed thereby upwardly into said coalescing material;
said gaseous stream expanding while moving upwardly through said coalescing material to cause coalescing of liquid in said coalescing zone with downward flow thereof by gravity while said gaseous stream passes from the top opening; and
said liquid flowing downwardly by gravity passes from the lower opening.

14. The method of coalescing and removing a liquid from pressurized gas comprising the steps of:
providing an upright hollow column having a cylindrical inside coalescing zone packed with a coalescing material;
forming a gaseous stream in said coalescing column by directing pressurized gas upwardly of said coalescing column from an orifice of lesser diameter than said coalescing column subjecting said gaseous stream to the action of said coalescing material by direct contact therewith;
causing said liquid to coalesce and move downwardly in said coalescing column in a direction opposite to said upward flow of said gaseous stream;
removing said gaseous stream from a top end of said coalescing column after passing upwardly through said coalescing material; and
discharging said liquid from a bottom end of said coalescing column;
whereby coalescence of liquid occurs in a direction opposite to gravity with discharge of said liquid from said coalescing column.

* * * * *